US008919120B2

(12) United States Patent
Robinson

(10) Patent No.: US 8,919,120 B2
(45) Date of Patent: *Dec. 30, 2014

(54) WASTEGATE CONTROL SYSTEM AND METHOD

(71) Applicant: Honda Motor Co., Ltd., Tokyo, Minato-ku (JP)

(72) Inventor: James S. Robinson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,066

(22) Filed: Nov. 9, 2012

(65) Prior Publication Data

US 2013/0305710 A1 Nov. 21, 2013

Related U.S. Application Data

(62) Division of application No. 12/243,760, filed on Oct. 1, 2008, now Pat. No. 8,333,072.

(51) Int. Cl.
| | | |
|---|---|---|
| F02B 33/44 | (2006.01) | |
| F02D 23/00 | (2006.01) | |
| F02B 37/00 | (2006.01) | |
| F02B 29/04 | (2006.01) | |
| F02B 37/18 | (2006.01) | |
| F02D 41/00 | (2006.01) | |
| F02D 9/02 | (2006.01) | |

(52) U.S. Cl.
CPC ............... F02B 37/00 (2013.01); F02B 29/04 (2013.01); F02B 37/18 (2013.01); F02D 23/00 (2013.01); F02D 41/0007 (2013.01); F02D 2009/0201 (2013.01); F02D 2200/0404 (2013.01); Y02T 10/146 (2013.01); Y02T 10/144 (2013.01)
USPC ............... 60/602; 60/605.1; 701/103; 477/32

(58) Field of Classification Search
CPC .......... F02B 39/04; F02B 37/18; F02D 23/00; F02D 41/0007; F02D 31/00; F02D 43/00; F02D 31/001; F02D 31/002; F02D 31/004; F02D 35/0007; F02D 35/0023; F02D 2009/0201; F02D 2200/0402; F02D 2200/0404; F02D 2200/0406; F02D 2200/4118; Y02T 10/144; Y02T 10/146
USPC .................... 60/602, 605.1; 477/32; 701/103
See application file for complete search history.

(56) References Cited

U.S. PATENT DOCUMENTS

| | | |
|---|---|---|
| 4,005,578 A | 2/1977 | McInerney |
| 4,322,948 A | 4/1982 | Emmenthal et al. |

(Continued)

FOREIGN PATENT DOCUMENTS

| | | | | |
|---|---|---|---|---|
| EP | 2340367 | | 7/2011 | |
| JP | 63041622 A | * | 2/1988 | ............. F02B 37/12 |

(Continued)

OTHER PUBLICATIONS

MAchine translation for the reference to Endo et al. (Pub. No. JP 2006-144671 A), published on Jun. 8, 2006.*

(Continued)

*Primary Examiner* — Thai Ba Trieu
(74) *Attorney, Agent, or Firm* — Plumsea Law Group, LLC; Mark E. Duell

(57) ABSTRACT

A wastegate control system and a method for the wastegate control system is disclosed. The wastegate control system includes an ambient pressure sensor, a throttle angle sensor, an ignition timing sensor, a knock sensor, an intake charge temperature sensor and an intake charge humidity sensor. A wastegate is controlled according to information received from these sensors.

16 Claims, 6 Drawing Sheets

(56) References Cited

U.S. PATENT DOCUMENTS

| | | | |
|---|---|---|---|
| 5,083,434 A | 1/1992 | Dahlgren et al. | |
| 5,226,351 A | 7/1993 | Matsuoka et al. | |
| 5,813,231 A | 9/1998 | Faletti et al. | |
| 5,816,047 A | 10/1998 | Zurlo | |
| 5,974,801 A | 11/1999 | Houtz | |
| 6,134,888 A | 10/2000 | Zimmer et al. | |
| 6,226,981 B1 * | 5/2001 | Bruch et al. | 60/280 |
| 6,675,769 B2 | 1/2004 | Yip et al. | |
| 6,694,242 B2 | 2/2004 | Wong | |
| 6,725,848 B2 * | 4/2004 | Ramamurthy et al. | 123/568.22 |
| 6,779,344 B2 | 8/2004 | Hartman et al. | |
| 6,817,197 B1 * | 11/2004 | Padfield | 62/176.6 |
| 7,104,352 B2 | 9/2006 | Weinzierl | |
| 7,540,148 B2 * | 6/2009 | Wild et al. | 60/602 |
| 7,562,527 B2 * | 7/2009 | Eiraku | 60/602 |
| 7,698,048 B2 | 4/2010 | Jung et al. | |
| 8,051,842 B2 * | 11/2011 | Hagelstein et al. | 60/602 |
| 8,136,513 B2 * | 3/2012 | Schiestl et al. | 123/435 |
| 2006/0213194 A1 | 9/2006 | Hasegawa | |
| 2006/0237247 A1 | 10/2006 | Severinsky et al. | |
| 2006/0288702 A1 | 12/2006 | Gokhale et al. | |
| 2007/0022752 A1 | 2/2007 | Carbonne et al. | |
| 2007/0119410 A1 | 5/2007 | Leone et al. | |
| 2007/0240694 A1 | 10/2007 | Zhang | |
| 2009/0133391 A1 * | 5/2009 | Porten et al. | 60/303 |
| 2010/0077745 A1 | 4/2010 | Robinson | |

FOREIGN PATENT DOCUMENTS

| | | | | |
|---|---|---|---|---|
| JP | 2006144671 A | * | 6/2006 | F02B 37/18 |
| JP | 2008309004 A | * | 12/2008 | F02B 37/18 |
| JP | 2012504728 | | 2/2012 | |
| JP | 2012107630 | | 6/2012 | |
| WO | 8808486 | | 11/1988 | |
| WO | 2010039816 | | 4/2010 | |

OTHER PUBLICATIONS

International Search Report and Written Opinion mailed Apr. 6, 2010 in PCT Application No. PCT/US2009/59002.

International Preliminary Report on Patentability (including Written Opinion of the ISA) mailed Apr. 14, 2011 in International Application No. PCT/US2009/059002.

Supplementary European Search Report dated Mar. 14, 2012 in European Patent Application No. EP 09 81 8435.

* cited by examiner

WASTEGATE CONTROL SYSTEM AND METHOD

CROSS REFERENCE TO RELATED APPLICATION

This application is a division of U.S. Pat. No. 8,333,071, U.S. application Ser. No. 12/243,760, entitled "Wastegate Control System and Method", filed on Oct. 1, 2008, which patent is incorporated by reference herein in its entirety.

BACKGROUND

The present invention relates to motor vehicles and in particular to a wastegate control system and a method for controlling a wastegate.

Methods of controlling a wastegate have been previously proposed. Severinksy (U.S. patent number 2006/0237247) is directed at a hybrid vehicle, including an internal combustion engine. Severinsky teaches a wastegate that is implemented as a spring-loaded relief valve to limit the boost provided. Furthermore, the wastegate of the Severinsky design may take intermediate positions between fully-open and closed positions. Severinksky discloses the possibility of adjusting the wastegate to respond to an atmospheric-pressure signal provided by a suitable sensor to ensure that adequate boost is provided at higher altitudes to ensure vehicle performance.

Weinzierl (U.S. Pat. No. 7,104,352) is directed at an intercooler system and a method for a snowmobile with a supercharged engine. Weinzierl discloses a wastegate coupled to a turbine to allow for exhaust bypass of the turbine if the pressure of the charge air is too high. Furthermore, both the wastegate and the injector valve are controlled by an engine control unit, which makes use of inputs from an intercooler liquid level sensor, a charge air temperature sensor, and a knock sensor, in addition to other conventional inputs to the engine control unit.

Hartman (U.S. Pat. No. 6,779,344) is directed at a control system and method for a turbocharged throttled engine. In the Hartman design, engine exhaust flows from the engine to a turbocharger turbine and a wastegate valve to the exhaust. The wastegate is controlled according to an algorithm. During one step of the algorithm, the desired manifold pressure is retrieved according to an earlier step. A desired offset may be added to the manifold pressure during another step, giving a desired boost pressure value. The maximum boost is computed during another step. Hartman teaches that the maximum allowable pressure boost is computed in a known manner using the air flow rate and the known stored compressor characteristics. Following this, during the next step, the maximum boost is compared with the desired boost. If the desired boost is greater than the maximum boost, the desired boost is reset to equal the maximum boost. Otherwise, the desired boost level is kept the same. During another step, the wastegate is controlled according to the desired boost.

Wong (U.S. Pat. No. 6,694,242) is directed at a dual fuel engine having multiple dedicated controllers connected by a broadband communications link. The Wong design teaches a dual fuel engine that can operate in a dual fuel mode or in a diesel only mode. Both dual fuel controller and the diesel controller receive various types of inputs. In the Wong design, the dual fuel controller receives signals from a gas pressure sensor and a gas temperature sensor, and possibly other sensors. The diesel controller receives signals from a timing/speed sensor (also connected directly to dual fuel controller) and from a crankshaft speed/timing sensor. The diesel controller may further receive signals from a boost pressure sensor, an intake manifold air temperature sensor, an atmospheric air pressure sensor, an oil pressure sensor, a diesel fuel temperature sensor, an ambient temperature sensor as well as possibly other sensors.

Based on data received and/or calculated from the various sensors, the dual fuel controller transmits signals to the gas injectors, the gas shut-off valve, and the turbo wastegate control valve. Also, the diesel controller operates according to signals received from the various sensors, as well as signals received from the dual fuel controller.

Zimmer (U.S. Pat. No. 6,134,888) is directed at a turbocharger control management system. Zimmer teaches the use of an electronic turbocharger control system for an internal combustion engine that is provided to control at least one turbocharger by controlling a bypass valve and a wastegate in response to the engine speed, engine load, ambient temperature and the operating environment's barometric pressure. In particular, a turbocharger control module has a plurality of engine characteristic signal inputs, including an intake manifold pressure signal, an engine speed signal and an ambient temperature signal. These signals are determined according to a manifold pressure monitor, an engine speed monitor and an ambient temperature monitor, respectively. Based on characteristic values for these signals, a predetermined setting for the wastegate is selected from a group of predetermined settings.

Houtz (U.S. Pat. No. 5,974,801) is directed at a turbocharger control system. Houtz teaches a wastegate valve connected between the exhaust manifold and the turbine section that is movable between an open position at which fluid flow exhausted by the engine is free to bypass the turbine and a closed position at which fluid flow exhausted by the engine is restricted from bypassing the turbine. Several sensors are included in the Houtz design that are used to determine a control signal for the wastegate valve. The sensors include: a first means that senses the speed of crankshaft, used to determine the engine speed; a second means to sense the boost pressure of the engine; a third means that senses a rack position of the engine; and a fourth means that senses the barometric pressure of the engine environment.

Emmenthal (U.S. Pat. No. 4,322,948) is directed at an internal combustion engine comprising an exhaust driven turbocharger for generating maximum boost pressure in the intake manifold. The Emmenthal design includes a knock sensor that detects engine detonation and, in response, causes actuation of a valve for temporarily reducing the boost pressure such that knocking subsides.

While the prior art teaches the use of several sensors that may be associated with a wastegate controller, there are several shortcomings. The prior art lacks any use of a throttle angle sensor in association with a wastegate controller. Furthermore, the prior art lacks any reference to an intake charge humidity sensor that may be associated with a wastegate controller. There is a need in the art for a wastegate control system that makes use of a throttle angle sensor and an intake charge humidity sensor.

SUMMARY

A method for controlling a wastegate in a turbocharger is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a wastegate control system associated with a combustion device, comprising: a control unit in communication with a wastegate and a throttle angle sensor, the throttle angle sensor configured to measure a throttle angle; and where the control unit controls the wastegate according to information received via the throttle angle sensor.

In another aspect, the control unit is in communication with an intake charge temperature sensor.

In another aspect, the control unit is in communication with an intake charge humidity sensor.

In another aspect, the control unit is in communication with an engine speed sensor.

In another aspect, the control unit is in communication with an ambient pressure sensor.

In another aspect, the control unit is in communication with an ignition timing sensor.

In another aspect, the control unit is in communication with a knock sensor.

In another aspect, the invention provides a wastegate control system associated with a combustion device, comprising: a control unit in communication with a wastegate and an intake charge humidity sensor; and where the control unit controls the wastegate according to information received from the intake charge humidity sensor.

In another aspect, the control unit is in communication with an intake charge temperature sensor.

In another aspect, the control unit is in communication with a throttle angle sensor.

In another aspect, the control unit is in communication with an engine speed sensor.

In another aspect, the control unit is in communication with an ambient pressure sensor.

In another aspect, the control unit is in communication with an ignition timing sensor.

In another aspect, the control unit is in communication with a knock sensor.

In another aspect, the invention provides a method of controlling a wastegate during cruise mode, comprising the steps of: receiving information from a throttle angle sensor; receiving information about current cruise conditions; determining the power necessary to maintain the current cruise conditions; selecting an intake air volume required to provide the necessary power; and controlling a wastegate to achieve the selected intake air volume.

In another aspect, the current cruise conditions include a current vehicle speed.

In another aspect, there is a step of setting the throttle angle to a wide open position.

In another aspect, there is a step of receiving a current engine speed from an engine speed sensor.

In another aspect, the current engine speed may be used to determine the power necessary to maintain current cruise conditions.

In another aspect, the invention provides a method of controlling a wastegate, comprising the steps of: receiving information from an intake charge humidity sensor; determining the required boost pressure necessary to eliminate ignition timing retard; and controlling a wastegate to achieve the required boost pressure.

In another aspect, there is a step of receiving information from an intake charge temperature sensor.

In another aspect, there is a step of determining the required boost pressure necessary to eliminate ignition timing retard using information received from the intake charge temperature sensor and information received from the intake charge humidity sensor.

In another aspect, there is a step of receiving information from an ignition timing sensor.

In another aspect, there is a step of determining the current ignition timing retard according to information received from the ignition timing sensor.

In another aspect, the method provides a method for controlling a wastegate, comprising the steps of: receiving information associated with a combustion device from a plurality of sensors, the plurality of sensors comprising an ignition timing sensor, an engine speed sensor, an intake charge temperature sensor and an intake charge humidity sensor; calculating a first boost pressure to achieve peak power using information obtained from the ignition timing sensor and the engine speed sensor; calculating a second boost pressure to achieve peak power using information obtained from the intake charge temperature sensor and from the intake charge humidity sensor; comparing the first boost pressure and the second boost pressure and selecting a minimum boost pressure that is the lesser of the first boost pressure and the second boost pressure; and controlling a wastegate to achieve the minimum boost pressure.

In another aspect, the plurality of sensors includes a throttle angle sensor.

In another aspect, there is a step of receiving information from the throttle angle sensor.

In another aspect, there is a step of controlling the wastegate according to information received from the throttle angle sensor whenever the engine is in a cruise mode.

In another aspect, the plurality of sensors includes a knock sensor.

In another aspect, there is a step of controlling the wastegate according to information received by the knock sensor.

In another aspect, there is a step of controlling the wastegate according to a maximum allowed boost pressure whenever the engine is determined to be outside of a knock limited region, as determined by information received from the knock sensor.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in FIG. 1 is a schematic view of an embodiment of a turbocharged engine system.

DETAILED DESCRIPTION

Figure 1:
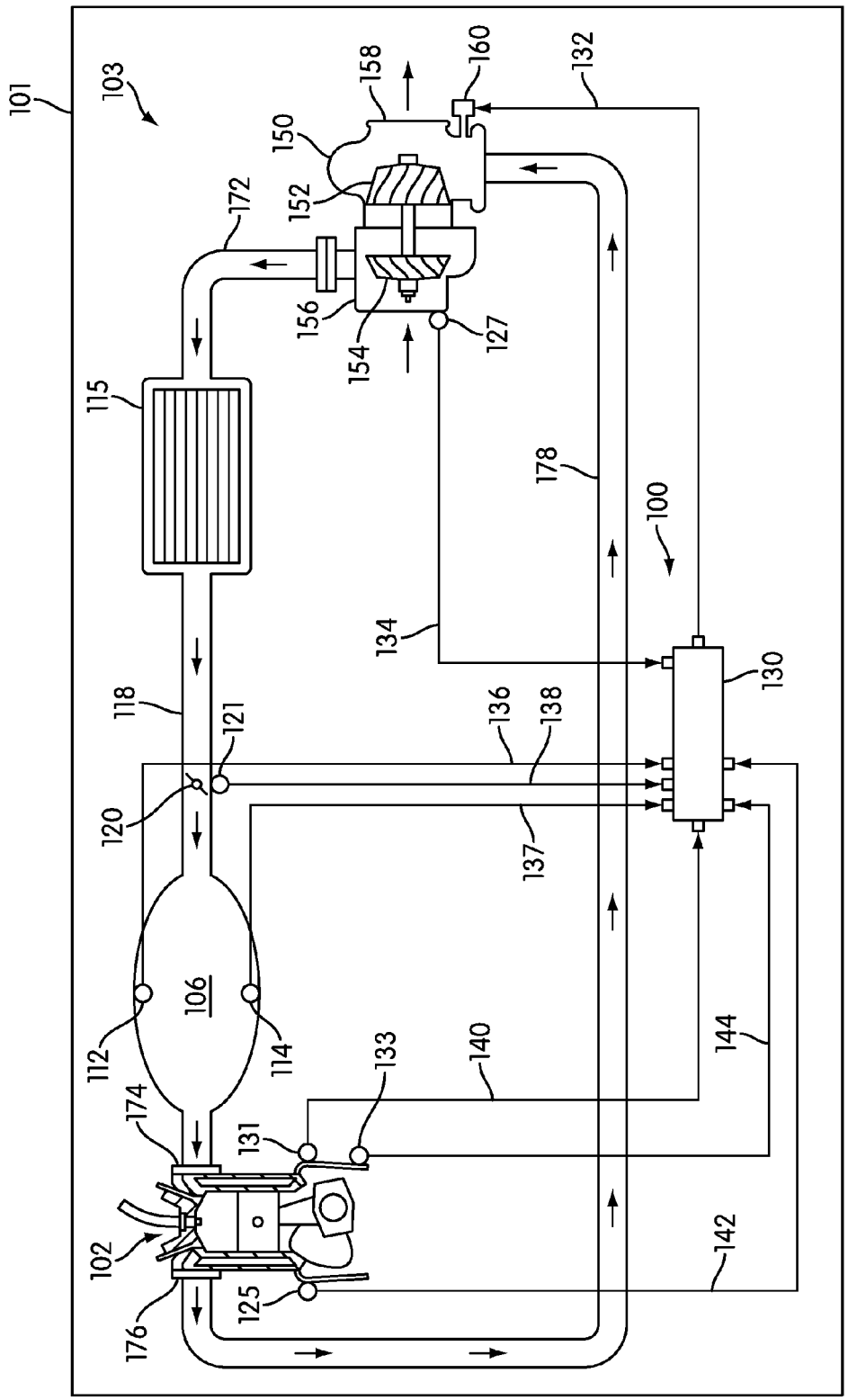

FIG. 1 is a schematic view of an embodiment of motor vehicle 101. It should be understood that the embodiment discussed here is not intended to illustrate all of the components that are necessary for motor vehicle 101 to function. Instead, the embodiment of motor vehicle 101 seen in FIG. 1 is only intended to illustrate some components of motor vehicle 101, especially those components related to generating power and in particular those components typically associated with an engine.

Motor vehicle 101 may include combustion device 102. For the purposes of clarity, combustion device 102 is shown in FIG. 1 as a portion of an engine. Generally, combustion device 102 may be any kind of engine. In some embodiments, combustion device 102 may be a hybrid power system. Additionally, combustion device 102 may comprise multiple engines.

Motor vehicle 101 may also be associated with intercooler 115. Intercooler 115 may be any type of intercooler, including, but not limited to, a top mounted intercooler, a front mounted intercooler and a v-mounted intercooler. In other embodiments, intercooler 115 may be another type of intercooler. In some embodiments, wastegate control system 100 may not include intercooler 115 or wastegate control system 100 may include a different type of heat exchange device.

Motor vehicle 101 may further comprise turbocharger 150. Turbocharger 150 may include turbine 152, as well as compressor 154. Turbocharger 150 could be any type of turbocharger. In some embodiments, turbocharger 150 could also be a supercharger.

Using the configuration described here, combustion engine 102, intercooler 115 and turbocharger 150 may work in conjunction to facilitate the production of power within motor vehicle 101. In this embodiment, air generally flows through each of various components 102, 115 and 150 to facilitate the combustion of fuel within combustion device 102. Generally, components 102, 115 and 150 may collectively be referred to as power system 103. In some embodiments, power system 103 may include additional components that facilitate the exchange of air between components 102, 115 and 150.

The following is a brief description of an embodiment of the flow of air through power system 103. Generally, air enters power system 103 through air inlet 156 of turbocharger 150. This ambient air may be compressed via compressor 154 and then fed into intercooler 115 via first hosing 172. After the air has moved through intercooler 115, the air may proceed through throttle body 118 and intake manifold 106. Throttle body 118 may include throttle valve 120 that may be used to regulate the flow of air to intake manifold 106. Finally, once the air has reached intake manifold 106, it may enter combustion device 102 at intake port 174. As the air enters combustion device 102 it may be combined with fuel from a fuel injector.

On the other side of combustion device 102, exhaust gas is expelled through outlet port 176, and continues along second hosing 178 until the exhaust gas is delivered to turbocharger 150. At this point, the exhaust drives turbine 152 within turbocharger 150, which simultaneously spins compressor 154. As air is drawn into turbocharger 150 at air inlet 156, the air is compressed and fed back into first hosing 172, to repeat the cycle over again. Also, the exhaust gas that drives turbine 152 is finally expelled through exhaust port 158 of turbocharger 150.

Turbocharger 150 may include provisions for reducing the amount of exhaust gas received at turbine 152. In this embodiment, turbocharger 150 may include wastegate 160. Wastegate 160 may be configured to open and close in order to modify the amount of exhaust gas received at turbine 152. As the amount of exhaust gas received at turbine 152 is reduced, turbine 152 and compressor 154 may spin less rapidly, reducing the boost pressure downstream of compressor 154. Likewise, as the amount of exhaust gas received at turbine 152 is increased, turbine 152 and compressor 154 may spin more rapidly, increasing the boost pressure downstream of compressor 154.

In some embodiments, power system 103 may include control unit 130. Control unit 130 may be a computer of some type configured to control wastegate 160. In an embodiment, control unit 130 may include provisions for wastegate 160. Throughout the following detailed description, wastegate control system 100 refers collectively to control unit 130 and wastegate 160 as well as any other provisions that may facilitate the operation of wastegate 160, including for example, various sensors.

In some embodiments, for example, wastegate control system 100 may include provisions for determining the temperature and/or humidity of the air disposed within intake manifold 106 and introduced to combustion device 102. In some embodiments, intake manifold 106 may include various sensors. In an embodiment, intake manifold 106 may include provisions for determining the temperature associated with intake manifold 106. Also, intake manifold 106 may include provisions for determining the humidity associated with intake manifold 106.

Intake manifold 106 may include intake charge temperature sensor 112. In some embodiments, intake charge temperature sensor 112 may be disposed within intake manifold 106. Generally, intake charge temperature sensor 112 may be any device that measures the temperature of air within intake manifold 106. In some embodiments, intake manifold 106 may also include intake charge humidity sensor 114. Intake charge humidity sensor 114 may be disposed within intake manifold 106.

Wastegate control system 100 may further include provisions for determining the current operating parameters of throttle body 118. Throttle body 118 may include throttle valve 120. Throttle valve 120 may open and close in a manner that changes the airflow rate into intake manifold 106. In an embodiment, throttle body 118 includes throttle angle sensor 121. Throttle angle sensor 121 may be configured to measure the angle of throttle valve 120 as measured from an initial position.

In some embodiments, wastegate control system 100 may include provisions for measuring various parameters associated with combustion device 102. In some cases, it may be important to know the current engine speed. In some embodiments, wastegate control system 100 may include engine speed sensor 125. Engine speed sensor 125 may be associated with combustion device 102. For the purposes of illustration, engine speed sensor 125 is disposed next to combustion device 102. However, in some embodiments, engine speed sensor 125 may be disposed on a portion of combustion device 102 not shown in this schematic illustration. In an embodiment, engine speed sensor 125 may be a crankshaft sensor.

In some cases, it may be important to determine other parameters associated with the operating conditions of combustion device 102, including the current ignition timing and the knock level. Wastegate control system 100 may include ignition timing sensor 131 as well as knock sensor 133. Using sensors 131 and 133, wastegate control system 100 may be configured to respond to various operating conditions of combustion device 102.

Additionally, wastegate control system 100 may include provisions for measuring ambient pressure outside of power system 103. Wastegate control system 100 may include ambient pressure sensor 127. In some embodiments, ambient pressure sensor 127 may be disposed near turbocharger 150 and in a position suitable to measure the ambient pressure. In other embodiments, ambient pressure sensor 127 may be disposed anywhere on motor vehicle 101.

Control unit 130 may be in communication with wastegate 160, ambient pressure sensor 127, throttle angle sensor 121, engine speed sensor 125, ignition timing sensor 131, knock sensor 133, intake charge temperature sensor 112 and intake charge humidity sensor 114. In some embodiments, control unit 130 may communicate with various devices by using electrical connections. Specifically, control unit 130 may be connected to wastegate 160 by first connection 132. In a similar manner, control unit 130 may be connected to the following sensors: to ambient pressure sensor 127 by second connection 134; to intake charge temperature sensor 112 by third connection 136; to intake charge humidity sensor 114 by fourth connection 137; to throttle angle sensor 121 by fifth connection 138; to ignition timing sensor 131 by sixth connection 140; to engine speed sensor 125 by seventh connection 142; and to knock sensor 133 by eighth connection 144. These various connections could be electrical, optical or wireless.

As previously discussed, wastegate 160 may be controlled in order to modify the boost pressure downstream of compressor 154. Various methods for controlling wastegate 160 using control unit 130 in association with one or multiple sensors 112, 114, 121, 125, 127, 131 and 133 will be discussed throughout the remainder of this detailed description. In particular, wastegate control system 100 may be configured to control wastegate 160 using information from particular sensors depending on the current operating conditions of power system 103.

In one embodiment, wastegate control system 100 may be configured to control wastegate 160 in response to changes in ambient pressure and/or altitude, which are directly related to one another. Typically, engines operating in higher elevations may experience less knock than engines operating in lower elevations. During operating conditions where knock is less frequent, boost pressure may be increased in power system 103 in order to achieve greater power. Therefore, wastegate control system 100 may include provisions for increasing the boost pressure with increasing elevation. Likewise, wastegate control system 100 may include provisions for decreasing the boost pressure with decreasing elevation, as decreasing the boost pressure may generally reduce the frequency of knocking in operating conditions where knock may occur.

Figure 2:
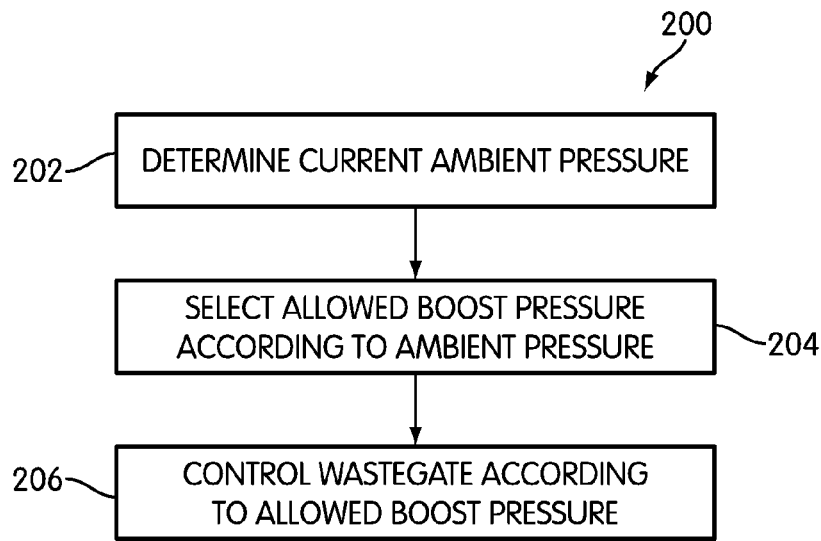
FIG. 2 is an embodiment of a flow chart of the process of controlling a wastegate using an ambient pressure sensor.
Figure 3:
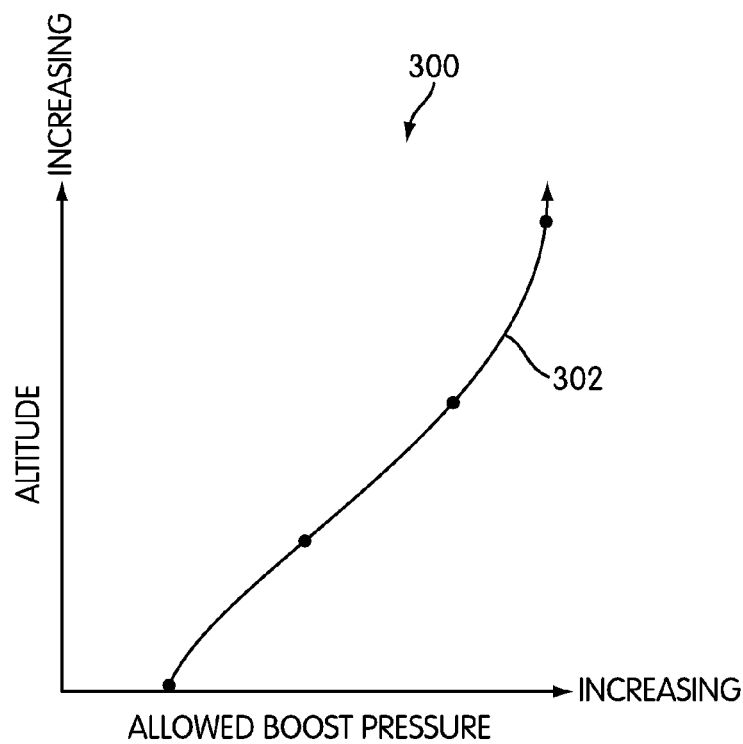
FIG. 3 is an embodiment of a chart showing the relationship of allowed boost pressure to altitude.

Referring to FIGS. 2 and 3, control unit 130 may control wastegate 160 according to the ambient pressure. Flow chart 200 is one embodiment of a method for controlling wastegate 160 according to the ambient pressure. During a first step 202, control unit 130 may determine the current ambient pressure as measured by ambient pressure sensor 127. Because ambient pressure is related directly to altitude, the ambient pressure can be used to estimate the current altitude. During a second step 204, control unit 130 may select an allowed boost pressure according to the current altitude.

FIG. 3 is an embodiment of chart 300 used to determine the allowed boost pressure for various altitudes. In particular, as the altitude increases the allowed boost pressure increases, though not in a strictly linear manner, as indicated by plotted line 302. By inputting a value for the current altitude, as determined from the ambient pressure measurement, control unit 130 may determine the allowable boost pressure from a similar type of chart or table. It should be understood that chart 300 is only meant to illustrate a predetermined relationship between altitude and allowed boost pressure. In other embodiments, plotted line 302 may have a different shape, although the general trend of increasing the allowed boost pressure with altitude still holds.

Following this, during a third step 206, control unit 130 may control wastegate 160 according to the previously selected allowed boost pressure. In other words, control unit 130 may compute the volume of air which is based on the exhaust gas being received at turbine 152 in order to achieve the allowed boost pressure via compressor 154. Using this computed air volume, control unit 130 may the open or close wastegate 160 in order to increase or reduce the gas volume being delivered into the turbine 152 of the turbocharger 150. With this arrangement, power system 103 may generate increased power for higher altitude conditions where combustion device 102 is not knock limited.

Wastegate control system 100 may include further provisions for adjusting the boost pressure in order to reduce or eliminate knock in combustion device 102 whenever knock occurs under any operating conditions. Generally, as previously discussed, the degree of knocking that occurs in combustion device 102 may decrease as the boost pressure is decreased.

Figure 4:
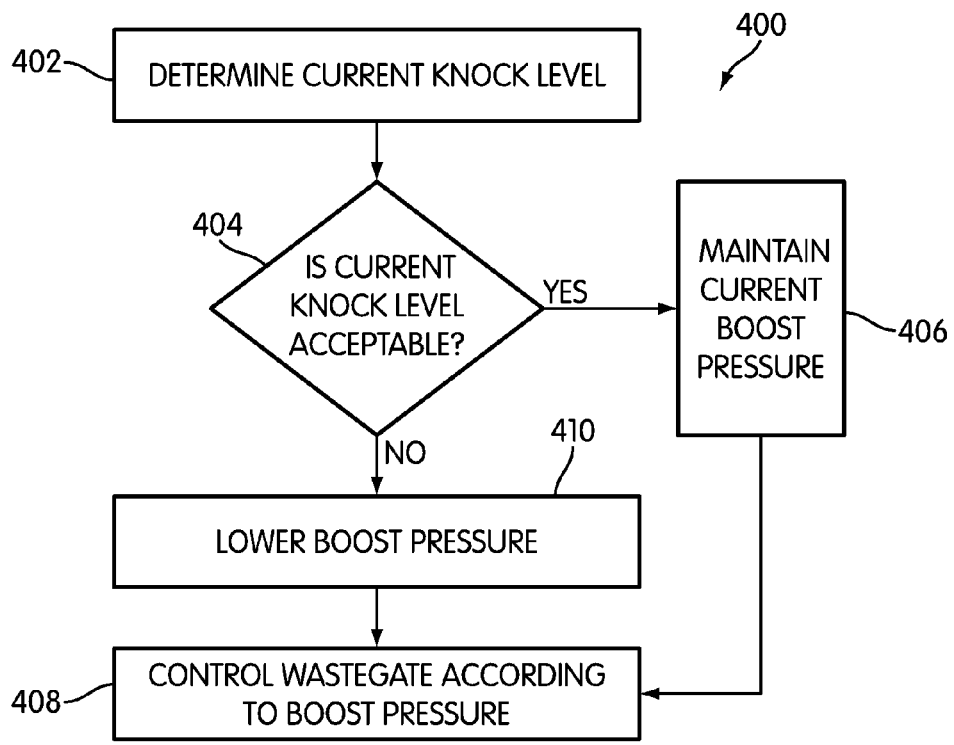
FIG. 4 is an embodiment of a flow chart of the process of controlling a wastegate using a knock sensor.

FIG. 4 is an embodiment of flow chart 400 of a method of controlling wastegate 160 according to the amount of knock experienced within combustion device 102. During a first step 402, control unit 130 may determine the current knock level according to information received by knock sensor 133. Following this, during a second step 404, control unit 130 compares the current knock level with a threshold to determine if the current knock level is acceptable. If the current level of knock is acceptable, control unit 130 proceeds to a third step 406, where the current boost pressure is maintained. At this point, during a fourth step 408, control unit 130 controls wastegate 160 to maintain the current boost pressure.

If, during second step 404 the current knock level is found to be above the threshold, in other words the current knock level is unacceptable, control unit 130 may proceed to fifth step 410. During a fifth step 410, control unit 130 may lower the current boost pressure. Following this, during step 408, control unit 130 adjusts wastegate 160 accordingly in order to lower the current boost pressure. Using this method, the amount of knocking within combustion device 102 may be reduced or eliminated under a variety of operating conditions.

In some embodiments, wastegate control system 100 may include provisions for adjusting boost pressure via wastegate 160 to accommodate the current power demand. This is especially important in turbocharged engine systems where some lag may occur between the driver stepping on the accelerator and the engine responding due to the distance between various components within power system 103 and the time it takes the pressurized air to travel between these various components. In order to reduce this lag time, power system 103, and in particular turbocharger 150, may be configured to respond to power demands before the air within power system 103 has completed a full cycle through each of the various components.

The current power demand may be determined, for example, by considering the angle of the throttle valve. A higher throttle angle will be associated with a higher power demand, and thus a higher boost pressure may be supplied in order to accommodate the higher power demand. Likewise, a lower throttle angle will be associated with a lower power demand, and thus a lower boost pressure may be supplied in order to accommodate the lower power demand.

Figure 5:
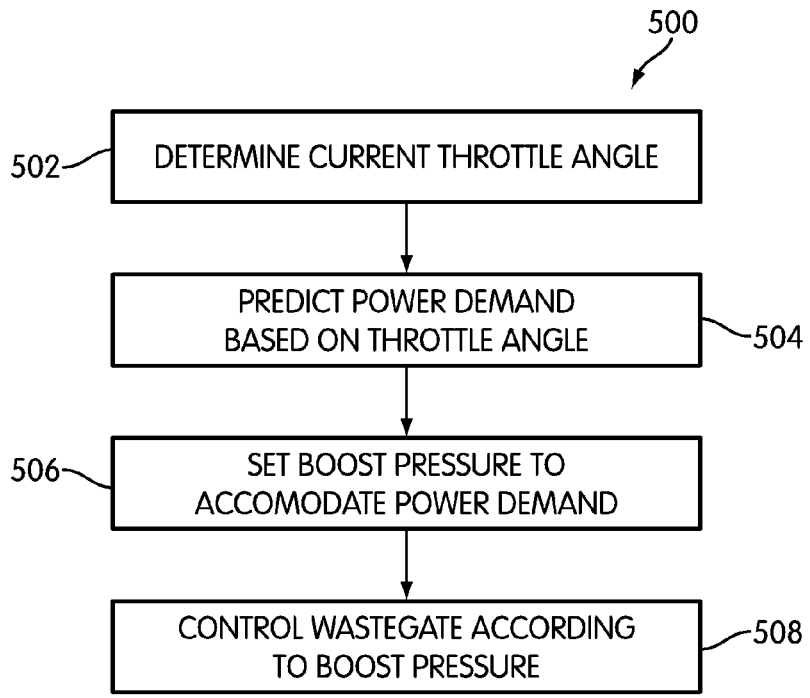
FIG. 5 is an embodiment of a flow chart of the process of controlling a wastegate using a throttle angle sensor.

FIG. 5 is an embodiment of flow chart 500 of a process for controlling wastegate 160 according to the current throttle angle. During a first step 502, control unit 130 may determine the current throttle angle via information received by throttle angle sensor 121. Following this, during a second step 504, control unit 130 may predict the power demand of the engine according to the throttle angle. Next, during a third step 506, control unit 130 calculates the required boost pressure necessary to meet the current power demand. Finally, during a fourth step 508, control unit 130 controls wastegate 160 to achieve the required boost pressure.

In another embodiment, wastegate control system 100 could be configured to control wastegate 160 in response to conditions related to cruise mode (cruise control). Typically, in cruise mode a constant vehicle speed is set by a driver and maintained by control unit 130 using throttle valve 120 to control the air volume received into intake manifold 106. In some embodiments, however, wastegate control system 100 may include provisions for adjusting the boost pressure in a manner to maintain a constant speed during cruise mode. In particular, rather than using throttle valve 120 to modify the air volume received at intake manifold 106, wastegate 160 could be used to modify the required boost pressure to maintain a constant vehicle speed. In other words, wastegate 160 could effectively be used to 'throttle' the air received at intake manifold 106. In such cases, throttle valve 120 could be set to a wide open angle.

Figure 6:
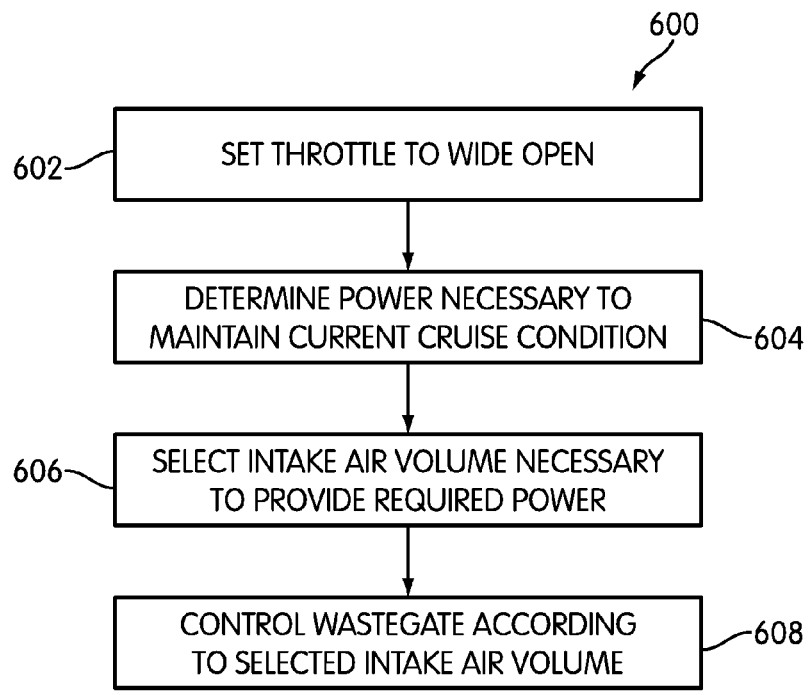
FIG. 6 is an embodiment of a flow chart of the process of controlling a wastegate using a throttle angle sensor.

FIG. 6 is an embodiment of flow chart 600 of a process for controlling wastegate 160 in order to maintain a constant cruising speed during cruise mode. During a first step 602, control unit 130 sets throttle valve 120 to wide open. Following this, during a second step 604, control unit 130 may determine the power necessary to maintain the constant speed set for the cruise condition. This could be done, in some embodiments, from the current engine speed that is measured by engine speed sensor 125. Next, during a third step 606, control unit 130 calculates the intake air volume necessary to provide the required power for maintaining the current cruising speed. Finally, during a fourth step 608, control unit 130 controls wastegate 160 in order to supply the required air volume for maintaining the current cruising speed. Using this wide open throttle configuration, wastegate control system 100 may reduce or substantially eliminate pumping losses and increase the efficiency of power system 103.

Figure 7:
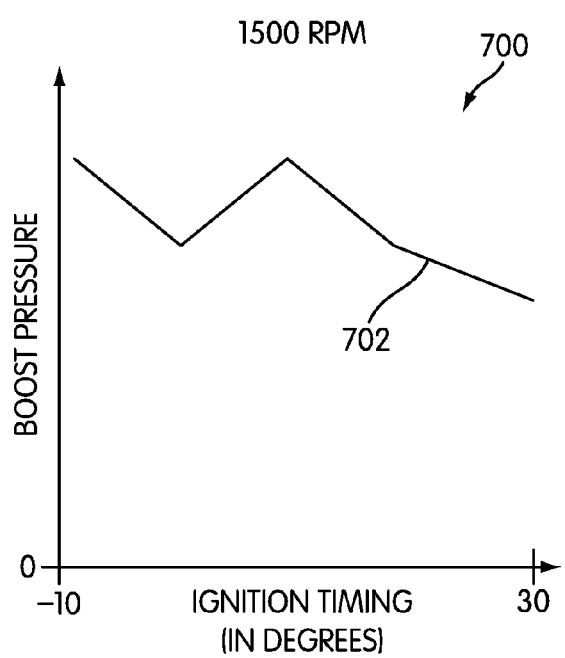
FIG. 7 is an embodiment of a chart showing the relationship of ignition timing to boost pressure.

In another embodiment, wastegate control system 100 could be configured to control wastegate 160 in response to ignition timing. Generally, there is an optimum balance between ignition timing and boost pressure at each engine speed and load. For example, FIG. 7 illustrates an embodiment of chart 700 showing an optimized relationship (indicated by line 702) between ignition timing and boost pressure at 1500 RPM and a fixed engine load. Given a particular value for ignition timing, an associated boost pressure may be found using chart 700 in order to achieve peak power.

Figure 8:
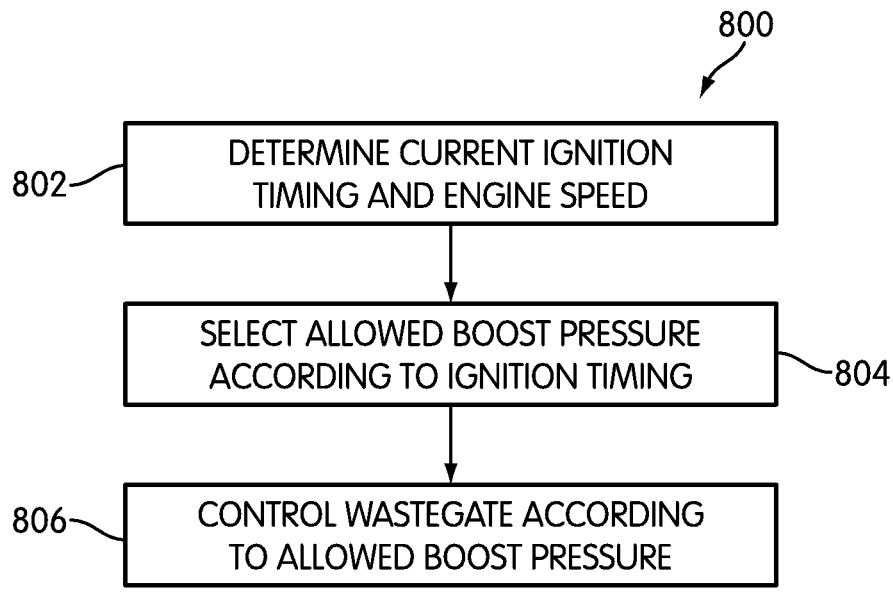
FIG. 8 is an embodiment of a flow chart of the process of controlling a wastegate using an ignition timing sensor.

FIG. 8 is an embodiment of flow chart 800 of a process for controlling wastegate 160 in order to achieve peak power for a given ignition timing, engine speed and engine load. During a first step 802, control unit 130 may determine the current ignition timing value according to information received via ignition timing sensor 131. In an embodiment, information related to engine speed and/or engine load may also be determined during this step by receiving information from engine speed sensor 125 as well as possibly other sensors. Following step 802, during a second step 804, control unit 130 may select an allowed boost pressure based on the current values of the ignition timing, the engine speed and/or the engine load. Control unit 130 may refer to a look-up table including information similar to the information displayed in chart 700, for example. Finally, during a final step 806, control unit 130 may control wastegate 160 in order to achieve the allowed boost pressure as determined during the previous step 804.

In another embodiment, wastegate control system 100 may be configured to control wastegate 160 in response to intake charge conditions. In some cases, unwanted ignition timing retard may occur due to knock limitation. Wastegate control system 100 may include provisions for reducing this unwanted ignition timing retard. In some cases, wastegate control system 100 may modify boost pressure using information related to intake charge conditions in order to reduce or substantially eliminate ignition timing retard.

Figure 9:
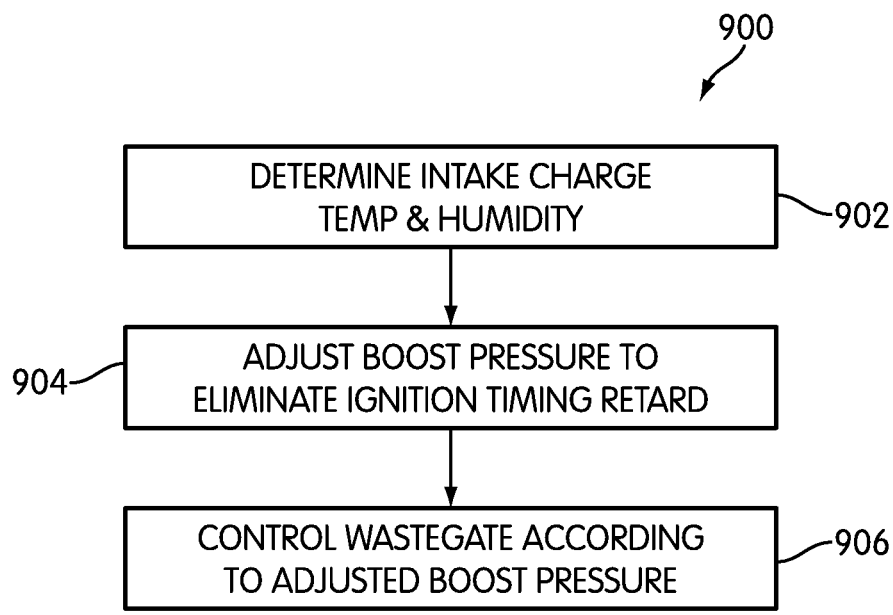
FIG. 9 is an embodiment of a flow chart of the process of controlling a wastegate according to intake charge conditions.

FIG. 9 is an embodiment of a flow chart 900 of a process of controlling wastegate 160 in order to reduce or substantially eliminate ignition timing retard. During a first step 902, control unit 130 may determine the intake charge temperature and humidity according to information received via intake charge temperature sensor 112 and intake charge humidity sensor 114. Following step 902, during a second step 904, control unit 130 may calculate an adjusted boost pressure in order to eliminate ignition timing retard. In some embodiments, the ignition timing retard could be known by control unit 130. In another embodiment, the ignition timing retard could be determined using ignition timing sensor 131. Finally, during a third and final step 906, control unit 130 may control wastegate 160 in order to achieve the adjusted boost pressure calculated during the previous steps.

The previous embodiments demonstrate possible methods or processes for controlling wastegate 160 using information obtained by one or possibly several sensors. In some embodiments, these various methods or processes could be combined and used in conjunction with one another. The following discussion applies to an embodiment of a method or process for controlling wastegate 160 using information from all of the sensors previously discussed, including: intake charge temperature sensor 112, intake charge humidity sensor 114, throttle angle sensor 121, engine speed sensor 125, ambient pressure sensor 127, ignition timing sensor 131 and knock sensor 133. It should be understood, however, that many other possible configurations of each of the processes previously discussed could be combined to create another process or method for controlling wastegate 160. In particular, using different methods for controlling wastegate 160 depending on different operating conditions may facilitate achieving maximum efficiency for combustion device 102.

Figure 10:
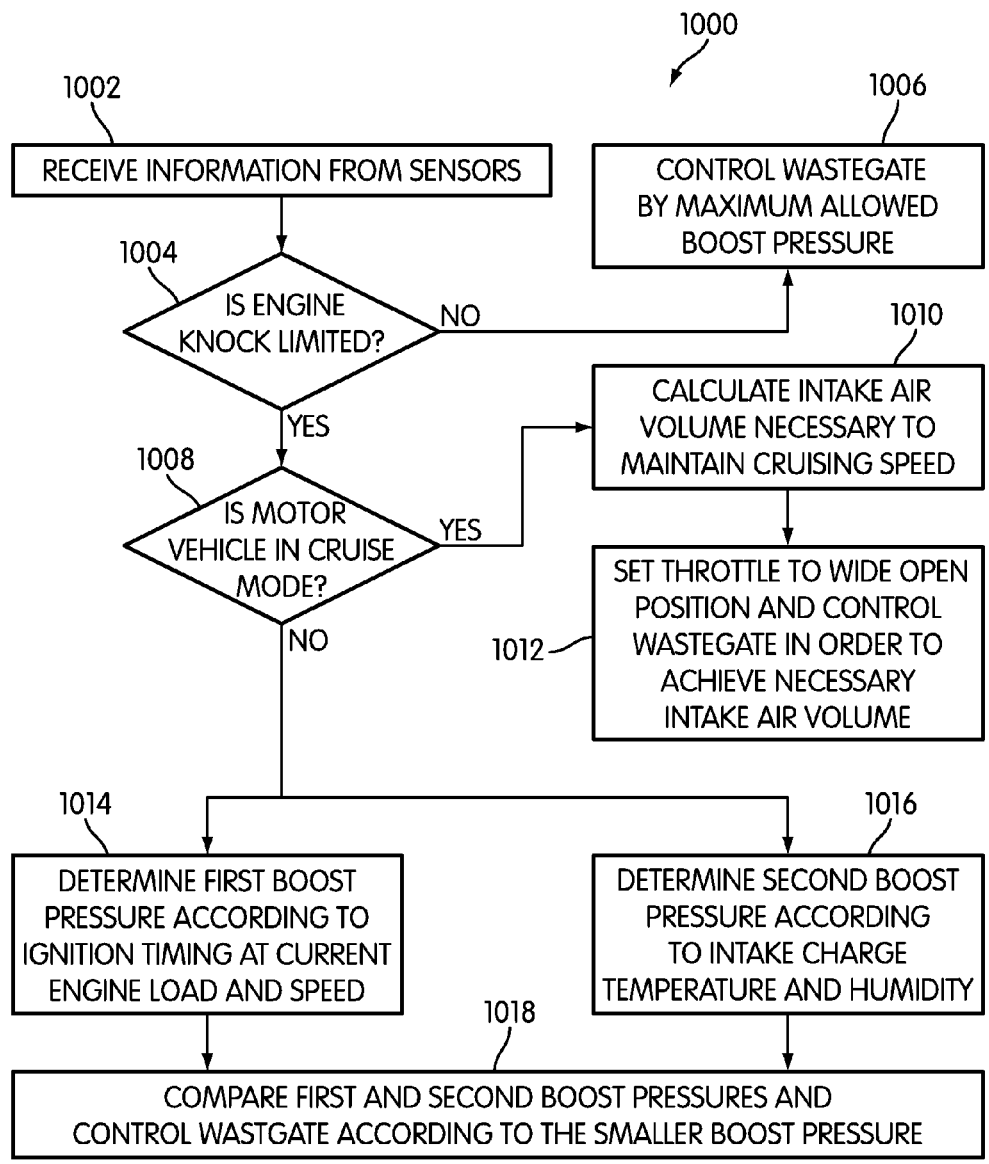
FIG. 10 is an embodiment of a flow chart of the process of controlling a wastegate according to information received by multiple sensors.

FIG. 10 is an embodiment of a flow chart 1000 of a process for controlling wastegate 160 in order to achieve maximum efficiency for combustion device 102 under various operating conditions. During step 1002, control unit 130 may receive information related to various sensors, including intake charge temperature sensor 112, intake charge humidity sensor 114, throttle angle sensor 121, engine speed sensor 125, ambient pressure sensor 127, ignition timing sensor 131 and knock sensor 133. Additionally, during step 1002, control unit 130 may receive other information, including information related to engine load as well as current vehicle speed or other information related to cruise mode conditions. Following step 1002, control unit 130 may determine if combustion device 102 is in a knock limited region during step 1004. Control unit 130 may make this decision on the basis of information received by ambient pressure sensor 127, which can be further converted to altitude information, as previously discussed. If combustion device 102 is not in a knock limited region, control unit 130 may proceed to step 1006. During step 1006, control unit 130 may control wastegate 160 in order to achieve the maximum allowed boost pressure. In some cases, the maximum allowed boost pressure may be limited by various parameters, including injector duty, drive train restraints as well as other restraints associated with combustion device 102.

If, during step 1004, combustion device 102 is determined to be in a knock limited region, control unit 130 may then proceed to step 1008. During step 1008, control unit 130 determines if the motor vehicle is operating in cruise mode. If the engine is operating in cruise mode, control unit 130 may proceed to step 1010. During step 1010, control unit 130 may calculate the intake air volume necessary to maintain the current cruising conditions, including the current or preset vehicle speed. Following this, during step 1012, control unit 130 may set throttle valve 120 to a wide open position, and then controls wastegate 160 in order to achieve the necessary intake air volume calculated during step 1010.

If, during step 1008, the motor vehicle is determined not to be in cruise mode, control unit 130 may proceed to step 1014 and step 1016 simultaneously. During step 1014, control unit 130 may determine a first boost pressure according to the current ignition timing value, as well as engine speed and engine load. The current ignition timing value may be received from ignition timing sensor 131 during step 1002. Likewise, the engine speed value may be received from engine speed sensor 125 during step 1002. The engine load may be determined using information from other sensors as well. During step 1016, control unit 130 may calculate a second boost pressure according to the intake charge temperature and the intake charge humidity, which may be received from intake charge temperature sensor 112 and intake charge humidity sensor 114, respectively.

Finally, following both steps 1014 and 1016, control unit 130 may proceed to final step 1018. During step 1018, control unit 130 may compare the first boost pressure determined during step 1014 and the second boost pressure determined during step 1016. Control unit 130 then may select the smaller of these two values and controls wastegate 160 in order to achieve this selected boost pressure.

Using this method for controlling wastegate 160, power system 103 may be configured to achieve maximum power for the current operating conditions.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A wastegate control system associated with a combustion device, comprising:
    a turbocharger including a wastegate and a turbine;
    a throttle valve configured to regulate air flow into the combustion device;
    an ambient pressure sensor sensing an ambient pressure;
    a control unit in communication with the wastegate and in communication with an intake charge humidity sensor sensing an intake charge humidity; and
    wherein when the combustion device is operated in a cruise control mode, the control unit:
    determines an allowed boost pressure based on the ambient pressure and the intake charge humidity;
    sets the throttle valve wide open,
    and controls the wastegate to increase or decrease the volume of exhaust gas to be received at the turbine to achieve the allowed boost pressure.

2. The wastegate control system according to claim 1, wherein the control unit is in communication with an intake charge temperature sensor, and wherein the control unit also controls the wastegate according to information received from the intake charge temperature sensor.

3. The wastegate control system according to claim 1, wherein the control unit is in communication with a throttle angle sensor, and wherein the control unit also controls the wastegate according to information received from the throttle angle sensor.

4. The wastegate control system according to claim 1, wherein the control unit is in communication with an engine speed sensor, and wherein the control unit also controls the wastegate according to information received from the engine speed sensor.

5. The wastegate control system according to claim 1, wherein the control unit is in communication with an ambient pressure sensor, and wherein the control unit also controls the wastegate according to information received from the ambient pressure sensor.

6. The wastegate control system according to claim 1, wherein the control unit is in communication with an ignition timing sensor, and wherein the control unit also controls the wastegate according to information received from the ignition timing sensor.

7. The wastegate control system according to claim 1, wherein the control unit is in communication with a knock sensor, and wherein the control unit also controls the wastegate according to information received from the knock sensor.

8. A method of controlling a wastegate in a turbocharger system of a combustion device, said turbocharger system including a turbine, comprising the steps of:
    operating the combustion device in a cruise control mode;
    setting a throttle valve in the combustion device wide open;
    receiving humidity information from an intake charge humidity sensor in the turbocharger system;

receiving temperature information from an intake charge temperature sensor in the turbocharger system;

selecting an increased volume of exhaust gas to be received at the turbine to achieve an increased boost pressure in the turbocharger;

and controlling the wastegate according to the received humidity information, the received temperature information and the selected volume of exhaust gas.

9. The method according to claim 8, wherein there is a step of determining the required boost pressure necessary to eliminate ignition timing retard using information received from the intake charge temperature sensor and information received from the intake charge humidity sensor.

10. The method according to claim 8, wherein there is a step of receiving information from an ignition timing sensor, wherein the step of controlling the wastegate includes controlling the wastegate according to the information received from the ignition timing sensor.

11. The method according to claim 10, wherein there is a step of determining the current ignition timing retard according to information received from the ignition timing sensor.

12. A method for controlling a wastegate in a turbocharger system of a combustion device, wherein the turbocharger system comprises a turbocharger and a turbine, comprising the steps of:

operating the combustion device in a cruise control mode;

receiving information associated with the combustion device from a plurality of sensors, the plurality of sensors comprising a throttle angle sensor for measuring a throttle angle and an ambient pressure sensor sensing an ambient pressure;

and before the combustion device has completed a full cycle, controlling the wastegate according to the received information to increase the volume of exhaust gas to be received at the turbine to increase the boost pressure when the throttle angle is higher, and to decrease the volume of exhaust gas be received at the turbine to decrease the boost pressure when the throttle angle is lower.

13. The method according to claim 12, wherein there is a step of controlling the wastegate according to information received from the throttle angle sensor whenever the engine is in a cruise mode.

14. The method according to claim 12, wherein the plurality of sensors includes a knock sensor.

15. The method according to claim 14, wherein there is a step of controlling the wastegate according to information received by the knock sensor.

16. The method according to claim 14, wherein there is a step of controlling the wastegate according to a maximum allowed boost pressure whenever the engine is determined to be outside of a knock limited region, as determined by information received from the knock sensor.

* * * * *